(12) United States Patent
Schepers et al.

(10) Patent No.: US 9,222,386 B2
(45) Date of Patent: Dec. 29, 2015

(54) INJECTION DEVICE FOR METERING A LIQUID ADDITIVE, METHOD FOR FREEZING AN INJECTION DEVICE AND MOTOR VEHICLE

(71) Applicant: EMITEC GESELLSCHAFT FUER EMISSIONSTECHNOLOGIE MBH, Lohmar (DE)

(72) Inventors: Sven Schepers, Troisdorf (DE); Jan Hodgson, Troisdorf (DE); Rolf Brueck, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/299,141

(22) Filed: Jun. 9, 2014

(65) Prior Publication Data

US 2014/0283505 A1 Sep. 25, 2014

Related U.S. Application Data

(63) Continuation of application No. PCT/EP2012/073882, filed on Nov. 29, 2012.

(30) Foreign Application Priority Data

Dec. 7, 2011 (DE) .......................... 10 2011 120 457

(51) Int. Cl.
*F01N 3/00* (2006.01)
*F01N 3/20* (2006.01)

(52) U.S. Cl.
CPC ............ *F01N 3/2006* (2013.01); *F01N 3/2066* (2013.01); *F01N 2610/02* (2013.01); *F01N 2610/1453* (2013.01); *F01N 2610/1486* (2013.01); *Y02T 10/24* (2013.01)

(58) Field of Classification Search
USPC ................................................... 60/272–324
See application file for complete search history.

(56) References Cited

U.S. PATENT DOCUMENTS

| | | | |
|---|---|---|---|
| 6,513,323 B1 | 2/2003 | Weigl et al. | |
| 7,594,516 B2 | 9/2009 | Maisch et al. | |
| 8,074,673 B2 | 12/2011 | Maisch et al. | |
| 2010/0006568 A1* | 1/2010 | Haeberer et al. | 220/8 |
| 2011/0062357 A1* | 3/2011 | Pohl et al. | 251/129.01 |
| 2011/0113765 A1* | 5/2011 | Bruck et al. | 60/303 |
| 2012/0085085 A1 | 4/2012 | Wright et al. | |
| 2012/0174565 A1 | 7/2012 | Hodgson et al. | |
| 2013/0061578 A1* | 3/2013 | Van Vuuren | 60/295 |
| 2013/0327407 A1* | 12/2013 | Hermann et al. | 137/1 |
| 2014/0075923 A1* | 3/2014 | Hodgson et al. | 60/282 |

FOREIGN PATENT DOCUMENTS

| | | |
|---|---|---|
| DE | 19919426 C1 | 3/2000 |
| DE | 102008001092 A1 | 11/2008 |

(Continued)

*Primary Examiner* — Jesse Bogue
(74) *Attorney, Agent, or Firm* — Laurence Greenberg; Werner Stemer; Ralph Locher

(57) ABSTRACT

An injection device for the metering or addition of a liquid additive into an exhaust gas treatment device, includes an outlet region to be brought into contact with the exhaust gas treatment device, a connector region spaced apart from the outlet region and having a fluid-line connector, and a duct or channel for the additive extending from the connector region to the outlet region. A valve controls the metering or addition of the additive, and at least one heat-flow adjustment device defines a direction of freezing in the duct from the outlet region towards the connector region. A method for freezing an injection device, a method for producing an injection device and a motor vehicle are also provided.

13 Claims, 3 Drawing Sheets

(56) References Cited

FOREIGN PATENT DOCUMENTS

| DE | 102007026892 | A1 | 12/2008 |
| DE | 102008022991 | A1 | 11/2009 |
| DE | 102009032487 | A1 | 1/2011 |
| DE | 102009039735 | A1 | 3/2011 |
| EP | 1747394 | B1 | 10/2008 |
| JP | 2008261247 | A | 10/2008 |
| WO | 2010133685 | A1 | 11/2010 |

* cited by examiner

US 9,222,386 B2

INJECTION DEVICE FOR METERING A LIQUID ADDITIVE, METHOD FOR FREEZING AN INJECTION DEVICE AND MOTOR VEHICLE

CROSS-REFERENCE TO RELATED APPLICATION

This is a continuation, under 35 U.S.C. §120, of copending International Application No. PCT/EP2012/073882, filed Nov. 29, 2012, which designated the United States; this application also claims the priority, under 35 U.S.C. §119, of German Patent Application DE 10 2011 120 457.5, filed Dec. 7, 2011; the prior applications are herewith incorporated by reference in their entirety.

BACKGROUND OF THE INVENTION

Field of the Invention

The invention relates to an injection device for metering or adding a liquid additive into an exhaust-gas treatment device. The invention also relates to a method for freezing an injection device, a method for producing an injection device and a motor vehicle.

Exhaust-gas treatment devices to which an additive is fed are known from the prior art. In such exhaust-gas treatment devices, special exhaust-gas purification methods are carried out in which the exhaust gas from a connected internal combustion engine is purified with the aid of the additive. It is, for example, possible for certain pollutant constituents in the exhaust gas to be converted with the aid of the additive into non-hazardous substances, and/or for the ambient conditions in the exhaust-gas treatment device to be influenced by the metering of the additive in such a way that the influence is advantageous for a conversion. Water, fuel, oxidation agent and/or reducing agent may be used as the (liquid) additive.

An exhaust-gas purification method that is ever more commonly performed in exhaust-gas treatment devices is the method of selective catalytic reduction (SCR method) in which a reducing agent is fed to the exhaust gas with which nitrogen oxide compounds in the exhaust gas are converted to non-hazardous substances, specifically nitrogen, water and $CO_2$. Ammonia is preferably used as a reducing agent. Ammonia is normally not stored in motor vehicles as ammonia itself but rather in the form of a reducing agent precursor solution which can be converted to form the actual reducing agent as required. An aqueous urea solution, for example, may be used as a reducing agent precursor solution. A suitable 32.5% aqueous urea solution is available under the trademark AdBlue®. The reducing agent may be converted to form the reducing agent (ammonia) either outside the exhaust gas, in a converter provided for that purpose, and/or within the exhaust gas in the exhaust-gas treatment device. The conversion may take place purely by thermal action by heating the reducing agent precursor solution. Catalytic assistance of the conversion reaction by using a catalytic converter, in particular a so-called hydrolysis catalytic converter, is also possible. The expressions "reducing agent" and "reducing agent precursor solution" will hereinafter be used synonymously for one another.

In order to meter liquid additive into an exhaust-gas treatment device, consideration is given in particular to an injection device (including a nozzle, an injector, a valve or the like) which can be operated in a controlled fashion and/or operates autonomously (in a pressure-dependent manner). Due to the typically high temperatures of the exhaust gases in an exhaust-gas treatment device, the injection device should be constructed to be correspondingly resistant to high temperatures. A valve which is commonly disposed in the injection device can be opened and closed in a controlled manner for the feed of the liquid additive. A valve of that type is often particularly temperature-sensitive and should therefore be protected from the high temperatures of the exhaust-gas treatment device. In particular, it should be ensured that the dosing accuracy is not adversely affected even in the event of the temperature fluctuations.

A further problem is that aqueous additives (in particular reducing agents) can freeze at low ambient temperatures. The described 32.5% urea-water solution AdBlue®, for example, freezes at just $-11°$ C. Such low temperatures may be encountered in the vehicle, for example, during relatively long standstill periods. The additive expands as it freezes. In that case, the injection device may be damaged if additive is still situated therein when it freezes.

Various methods and devices are known from the prior art for protecting an injection device against the expansion of the reducing agent when the latter freezes. European Patent EP 1 747 394 B1, corresponding to U.S. Pat. Nos. 7,594,516 and 8,074,673, for example, presents an injection valve which is constructed so as to open when reducing agent situated in the valve freezes. Any volume expansion that occurs can then escape into the exhaust-gas treatment device. That is, however, associated with uncontrolled metering into the exhaust system, resulting not only in adverse reaction conditions but also in increased consumption.

German Patent Application DE 10 2009 032 487 A1 furthermore discloses the provision of an additional lateral valve on an injection device, in which the additional valve is connected to a return line to the reducing agent tank. Any volume expansion that occurs in the event of freezing can then be dissipated back into the tank through the valve. That version is, however, technically relatively cumbersome and may be susceptible to faults, because the return line must branch off actually within the interior of the injection device in order to achieve an evacuation there.

SUMMARY OF THE INVENTION

It is accordingly an object of the invention to provide an injection device for metering a liquid additive, a method for freezing an injection device, a method for producing an injection device and a motor vehicle, which overcome the hereinafore-mentioned disadvantages and at least partially solve the highlighted technical problems of the heretofore-known devices, methods and vehicles of this general type. In particular, the new injection device should not be damaged as a result of freezing of the additive. Furthermore, the injection device should be of particularly simple construction and inexpensive from a technical and control aspect. It is also sought to specify advantageous methods for the freezing of an injection device for an additive, and methods for producing an injection device of that type.

With the foregoing and other objects in view there is provided, in accordance with the invention, an injection device for metering or adding a liquid additive into an exhaust-gas treatment device, the injection device comprising an outlet region that can be placed in contact with the exhaust-gas treatment device, a connector region which is spaced apart from the outlet region and which has a fluid line connector and a duct, running from the connector region to the outlet region, for the additive, and the injection device has a valve for controlling the metering of the additive and at least one heat flow adjustment device which predefines a freezing direction in the duct from the outlet region toward the connector region.

An injection device refers, in particular, to a component which can, for example, be placed in contact with an opening, provided for that purpose, in the wall of an exhaust-gas treatment device or exhaust line. The injection device can thus be installed, attached and/or flange-mounted on the exhaust-gas treatment device in a permanent or detachable, but preferably gas-tight, manner. The injection device is, for example, composed of an injector and of an injector holder, and optionally of further elements. For example, a cap may be provided which closes off the injector holder and, in so doing, covers the injector. The injector is, for example, an injection valve similar to those used for the metering of fuel into an internal combustion engine.

The expressions "outlet region" and "connector region" each refer (in self-explanatory fashion) to regions of the injection device. If the injection device is regarded as a three-dimensional component, the outlet region is, in particular, the region which, in the installed state on an exhaust-gas treatment device, is disposed in the vicinity of the exhaust-gas treatment device, and the connector region is preferably the region in which a line for the additive can be connected to the injection device. There can typically be conceptually assumed to be a parting plane through the injection device between the outlet region and the connector region. The outlet region and the connector region are normally disposed opposite one another. The statement that the connector region is spaced apart from the outlet region means, in particular, that there is a spacing between the connector region and the outlet region. It is normally the case that the injection device is of elongate form and that the outlet region is situated on one side or on one end, and the connector region is situated on the opposite side or on the opposite end, of the injection device.

The duct is preferably formed in the interior of the injection device and connects the connector region to the outlet region. The additive flows through the duct from the fluid line connector into the exhaust-gas treatment device. The duct passes partially through the connector region and partially through the outlet region. The duct can be filled with additive. For this purpose, the duct has an internal volume. The duct need not run rectilinearly, but rather may have diversions, bends or the like. The duct also need not have a uniform duct cross section over its entire length from the connector region to the outlet region. Cross-sectional variations along the duct are possible in particular in the region of the valve.

The valve is preferably constructed so as to close off the duct (in a controlled manner and/or completely) at predefined points in time. When the duct is closed off by using the valve, additive can no longer be conducted through the duct of the exhaust-gas treatment device. The flow rate of additive that is fed can be controlled by using the valve. The valve may, for example, have a movable valve armature which closes off the duct when in the closed state and opens up the duct when in the open state. The valve armature may, for example, be moved electromagnetically. The valve has, for example, an electromagnetic coil which can exert a force on the movable valve armature when an electrical current flows through the coil.

The freezing direction preferably runs entirely along the duct. If the duct has at least one bend or curve, the freezing direction preferably follows the diversions. It is however also possible for the freezing direction to not completely or exactly follow every curve or every bend of the duct, but rather for an (imaginary) rectilinear connecting line to be defined which connects the outlet region and the connector region. At any rate, this is to be understood, in particular, to mean that the freezing direction is determined substantially by the profile of the duct from the outlet region to the connector region, or by the direction of the duct.

Heat flow adjustment devices on the injection device may be divided into two different groups. The first group of the heat flow adjustment devices are heat-conducting structures which promote an internal flow of heat through the heat-conducting structure. A heat flow is thus preferably oriented along a heat-conducting structure. The second group are heat insulators which prevent an internal heat flow through the heat insulator. A heat flow is therefore diverted by heat insulators.

Through suitable selection of the heat flow adjustment devices of the injection device with regard to placement and effect on a heat flow, it is possible to predefine a preferred, directed heat flow in the injection device in the event of freezing. A freezing direction of the injection device is generally oriented oppositely to the preferred flow direction of the heat flow. The orientation of the freezing direction and of the flow direction of the heat flow relative to one another arises automatically because, due to the heat flow, the heat is extracted initially where the heat can flow out most rapidly, and thus frozen additive forms there first. Thus, in the case of the injection device proposed herein, a plug of frozen reducing agent forms initially at the outlet region. The plug then grows or increases in size in the injection device in the direction of the connector region.

The at least one heat flow adjustment device is thus selected and located in such a way that, in the event of an ambient temperature remaining permanently below the freezing point of the additive, the additive situated in the duct freezes initially at the outlet region, and the ice formation then propagates toward the connector region. The associated increase in volume of the freezing additive in the duct is thus compensated in that additive fractions that are still in liquid form are forced in the direction of and beyond the connector region. It is thus possible for a possibly damage-causing ice pressure to be eliminated, wherein a technically simple return of additive into the reducing agent system is simultaneously achieved.

In accordance with another particularly advantageous feature of the injection device of the invention, the connector region is surrounded by a heat flow adjustment device in the form of a heat insulator, which heat flow adjustment device is formed as a plastics encapsulation which is injection-molded on the injection device.

If a heat insulator is provided at the connector region, then in the event of freezing or in the event of cooling of the injection device, a heat flow from the injection device through the connector region into the surroundings of the injection device is reduced. A heat flow out of the injection device through the outlet region is then more intense or greater than the described heat flow through the connector region. The heat insulator is preferably formed in such a way that the heat energy stored in the injection device is dissipated virtually entirely through the outlet region into a connected exhaust-gas treatment device, and/or no significant heat flow is dissipated through the connector region into the surroundings of the injection device. The injection device is preferably completely encapsulated by plastic. The injection-molded plastics encapsulation may be formed with additional material which is applied in regions to the continuous plastics encapsulation of the injection device. The continuous plastics encapsulation of the injection device may also be formed with a greater wall thickness in regions, that is to say, in particular, in the vicinity of the connector region, than in the region of the outlet region. It is possible in this way, too, for the heat flow out of the injection device in the connector region to be (further or more intensely) limited, whereas at the same time, the heat flow out of the injection device through the outlet region is promoted, thus giving rise to a freezing direction from the outlet region toward the connector region.

In accordance with a further advantageous feature of the injection device of the invention, the connector region is surrounded by a heat flow adjustment device in the form of a covering hood, wherein an air cushion is formed between the covering hood and the valve.

The air cushion (or space containing air) thus also exists between the covering hood and the duct running through the injection device. A heat flow adjustment device which is composed of a covering hood and an air cushion acts as a heat insulator which is disposed around the connector region of the injection device. It is self-evidently also possible for multiple (separate) air cushions to be used.

The two above-mentioned heat flow adjustment devices may be assigned to the second group mentioned above. Preferred examples of heat flow adjustment devices from the first group will, in particular, be explained below. The heat flow adjustment devices may self-evidently be used in any desired combination with one another.

In accordance with an added advantageous feature of the injection device of the invention, the outlet region has at least one heat flow adjustment device, in the form of a heat-conducting structure, for the outflow of heat from the injection device into an exhaust-gas treatment device that can be placed in contact.

A heat-conducting structure of this type promotes the heat flow out of the injection device through the outlet region. A heat-conducting structure may, for example, be in the form of a metallic insert in the injection device, in particular if the injection device is (externally) formed predominantly from plastic. A metallic insert as a heat-conducting structure may be integrally molded and/or integrally cast into the plastic. A metallic insert in an injection device formed from plastic has the effect that heat flows out through the metallic insert, and thus significantly determines the heat flow through the injection device. The heat-conducting structure may be in direct heat-conducting contact with the exhaust-gas treatment device. The exhaust-gas treatment device typically has a wall composed of metal (exhaust line). In a particularly preferred embodiment, the heat-conducting structure is connected directly to the wall of the exhaust-gas treatment device. This may be realized, for example, by using a screw. The heat-conducting structure may thus simultaneously also serve for the fastening of the injection device to the exhaust-gas treatment device. There is very particularly preferably intimate contact with the duct in the region of the outlet region. For example, the duct may also be at least partially formed or delimited there by the heat-conducting structure.

The heat-conducting structure is preferably formed in such a way that, in the shut-down state and/or in the event of freezing, the heat-conducting structure duly acts as a heat-conducting structure for conducting heat out of the injection device into the exhaust-gas treatment device, but during regular operation, the heat-conducting structure does not introduce heat, or introduces heat only to a relatively small extent, from the exhaust-gas treatment device into the injection device. This may be achieved, for example, by virtue of the heat-conducting structure being formed with at least one bimetal element. A bimetal element deforms under the influence of temperature. The heat-conducting structure formed with a bimetal element may be configured so as to (for example mechanically) eliminate thermal contact between the exhaust-gas treatment device and the injection device when the exhaust-gas treatment device is at high temperatures, and so as to produce thermal contact between the injection device and the exhaust-gas treatment device at low temperatures (in the event of freezing).

In accordance with an additional advantageous feature of the injection device of the invention, the injection device has a valve holder in which the valve is disposed and which is constructed for placing the injection device in contact with the exhaust-gas treatment device, wherein at least one coolant duct for a coolant is formed in the valve holder and it is possible for coolant to flow through the coolant duct, in order to cool the valve during the operation of the injection device, whereas during a break or pause in operation of the injection device, the coolant duct acts as a heat flow adjustment device in the form of a heat-conducting structure.

In the operation of an injection device during the operation of the exhaust-gas treatment device, it is advantageous for the temperature in the injection device not to rise to such an extent that the injection device (and, in particular, the valve disposed in the injection device) becomes damaged. For this purpose, the injection device may be formed with a coolant duct through which a coolant flows. The coolant duct may be connected to a cooling circuit of an internal combustion engine. The coolant of the internal combustion engine is then also used as coolant for the injection device. By using a liquid coolant, it is possible for a very large amount of heat to be dissipated from the injection device to the environment, even in the case of small temperature differences. During operation, the temperature of the injection device is then preferably not significantly higher than the temperature of the coolant.

During the time period in which the additive in an injection device freezes, the injection device and the cooling circuit are typically not in operation. The coolant situated in the injection device may however nevertheless be in the liquid state, because the coolant preferably contains substances that considerably lower the freezing point of the coolant, so that the coolant remains liquid even at very low temperatures. The coolant preferably remains in the liquid state at temperatures of less than $-20°$ C., and it is particularly preferable for the coolant to freeze only at temperatures below $-35°$ C. When the injection device is in the deactivated state, the coolant in the coolant duct in the injection device is thus present in liquid form. The coolant is however not kept in motion in the cooling circuit. Due to temperature differences in the coolant, it is nevertheless possible for a flow to be generated, or induced, in the coolant in the coolant duct. The flow may be utilized in such a way that the coolant duct forms a particularly effective heat-conducting device or a particularly effective heat-conducting structure in the injection device. The cooling duct is preferably formed in such a way that, in the event of freezing, it conducts heat from the injection device through the outlet region to an exhaust-gas treatment device by using a coolant flow in the coolant duct. There is very particularly preferably intimate contact with the duct in the region of the outlet region. For example, the duct may also be at least partially formed or delimited there by the wall of the cooling duct.

In accordance with yet another particularly advantageous feature of the injection device of the invention, at least one heat flow adjustment device in the form of a heat-conducting plate is disposed in the coolant duct.

A heat-conducting plate disposed in the coolant duct may even itself have a heat-conducting function. It is furthermore possible for a heat-conducting plate of this type to serve (merely) for promoting the flow of the coolant out of the injection device in one direction through the outlet region. A heat-conducting plate in the coolant duct may, in particular, serve to ensure that a (locally) circulating flow of reducing agent is generated in the coolant duct, which circulating flow, in a first flow direction, transports heat from the injection device to the outlet region, and in an opposite, second flow direction, forms a return flow in such a way that the coolant flows back when it has dissipated the heat in the outlet region. A heat-conducting plate of this type preferably divides the coolant duct into two ducts which, at least in sections, run parallel.

In accordance with yet a further particularly advantageous feature of the injection device of the invention, at least one ice pressure compensation element is provided on the connector region and an increase in volume of the additive when it solidifies can be compensated by the ice pressure compensation element.

An ice pressure compensation element is preferably constructed in such a way that, in the event of freezing, it opens up an additional volume into which the increase in volume of the additive when it solidifies can escape. For this purpose, a connector region may have a wall section which adjoins the additive and which is (in particular reversibly) movable. Due to a deflection movement, the wall section can increase the additive-filled volume in the duct. As already stated, during the freezing process, it is preferable for an ice plug composed of frozen additive to initially form in the outlet region of the injection device. The ice formation propagates further continuously in the freezing direction, in such a way that the liquid additive is forced toward the connector side proceeding from the outlet side. In order to be able to fully compensate the increase in volume of the additive (in the interior of the injection device) with the least possible technical outlay, it is advantageous for the ice pressure compensation element to be disposed where liquid additive is still present until last. Since, in the case of the injection device described herein, the freezing direction runs from the outlet side to the connector side, the ice pressure compensation element should be disposed at the connector side. At the connector side, the ice pressure compensation element is also particularly well protected against heat originating from the exhaust-gas treatment device during operation.

In accordance with yet an added particularly advantageous feature of the injection device of the invention, the ice pressure compensation element is in the form of a displaceable fluid line connector which is preloaded in such a way that, at a regular operating pressure, the fluid line connector is not displaced.

A displaceable fluid line connector may, for example, be formed as a plug connector which is mounted with a displaceable O-ring on an injector or on a valve in the injection device. Even in the event of a displacement of the fluid line connector relative to the injector, the connection between the fluid line connector and the injector is fluid-tight due to the O-ring. A preload of the fluid line connector may, for example, be realized by virtue of the fluid line connector being held in an operating position by using a stressed spring. If a force imparted by the increase in volume of the additive becomes greater than the force exerted by the spring, the fluid line connector is displaced out of the operating position into an ice compensation position.

With the objects of the invention in view, there is also provided a method for freezing an injection device for metering or adding a liquid additive into an exhaust-gas treatment device. The injection device has an outlet region which is placed in contact with the exhaust-gas treatment device, a connector region with a fluid line connector which is spaced apart from the outlet region, and a duct which runs from the connector region to the outlet region. The method comprises at least the following steps:

a) generating a heat flow from the injection device through the outlet region into the exhaust-gas treatment device by way of at least one heat flow adjustment device;

b) at least partially preventing a heat flow from the injection device through the connector region into surroundings of the injection device in the connector region;

c) predefining a freezing direction in the duct from the outlet region toward the connector region;

d) forming a plug of frozen reducing agent in the duct at the outlet region; and e) increasing the size of the plug in the freezing direction.

The described method is used in an injection device whenever the temperatures in the surroundings of the injection device have fallen to such an extent that the additive begins to freeze or solidify. In order to generate a heat flow in step a), heat-conducting structures and/or heat insulators may be used as heat flow adjustment devices in the described manner. Heat insulators have the effect that a heat flow forms wherever no or little heat insulation is present. A heat flow occurs, in particular, through heat-conducting structures that are provided.

The prevention of a heat flow in step b) may likewise be achieved in the described manner by using heat flow adjustment devices. Heat-conducting structures prevent a heat flow in directions other than the direction of the heat-conducting structure. Heat insulators prevent a heat flow through the insulator. A heat flow occurs, in particular, around heat insulators that are provided.

The heat flow adjustment device or adjustor serves to predefine a freezing direction in the duct, from the outlet region toward the connector region, for step c). The freezing direction does not need to be oriented exactly along the duct. The freezing direction may also only loosely follow the direction of the duct from the outlet region toward the connector region.

In step d), the duct in the injection device is blocked or closed off by a plug initially at the outlet region, in such a way that no more reducing agent can exit the injection device toward the exhaust line. It is preferable for the duct to be configured in the outlet region in such a way that the plug becomes firmly jammed in the duct and does not become detached or displaced as a result of an enlargement of the plug. This may, for example, be realized by using a rough and/or undercut duct wall in the outlet region and/or by using a component provided with a perforated structure (discontinuous surface structure).

In step e), the plug increases in size in the freezing direction (further in the direction of the connector region of the injection device) until the additive present in the injection device has frozen completely. The increase in volume of all of the additive in the injection device can then even subsequently, in a step f), be compensated by way of an ice pressure compensation element which limits the pressure in the duct or in the injection device.

Through the use of the described method, it is made possible for the reducing agent present in an injection device to freeze without the possibility of damage to the injection device.

In accordance with another particularly advantageous mode of the method of the invention, for step a), a coolant duct through which a heat flow flows out of the injection device through the outlet region into the exhaust-gas treatment device is used as the heat flow adjustment device.

For this purpose, a preferably (locally) circulating coolant flow forms in the coolant duct and the circulating coolant flow transports heat through the outlet region. For this purpose, cooled coolant flows in the direction out of the injection device toward the outlet region, and coolant that has been warmed again flows from the outlet region into the injection device. In this case, the expression "locally circulating" means, in particular, that the coolant does not circulate within the entire cooling circuit of a motor vehicle, but rather circulates only locally within the injection device.

With the objects of the invention in view, there is furthermore provided a method for producing an injection device for metering or adding a liquid additive into an exhaust-gas treatment device. The injection device includes at least one outlet region which can be placed in contact with an exhaust-gas treatment device, a connector region with a fluid line connector which is spaced apart from the outlet region, and a duct which runs from the connector region to the outlet region. The method comprises at least the following steps:

i) connecting the injection device to an exhaust-gas treatment device;
ii) filling the duct with additive;
iii) lowering the temperature in surroundings of the injection device;
iv) establishing a freezing direction of the additive in the duct; and
v) integrating at least one heat flow adjustment device on the injection device in such a way that a freezing direction from the outlet region to the connector region is realized.

The method according to the invention for producing an injection device may, in particular, also be used as a testing method for providing a suitable heat flow adjustment device on an injection device and/or for checking whether or not the injection device has a predefined freezing direction (steps i) to iv)).

In a first embodiment of the method for producing an injection device, it may be provided that the method steps i) to v) are performed once for a particular type of injection device, and then the heat flow adjustment devices are configured correspondingly for all injection devices of that type in a mass production context.

In a second embodiment of the method for producing an injection device, it may be provided that the method steps i) to v) are carried out once for every new application of an injection device. The heat flow adjustment devices may subsequently be configured correspondingly for all injection devices of a particular type used in that application. In this case, an "application" refers to a particular use of the injection device in a particular motor vehicle or in a particular type of motor vehicle. This approach is preferable, in particular, if the exhaust-gas treatment device has a significant and/or even definitive influence on the freezing direction.

For method step iii), it is advantageous for the temperature in the surroundings of the injection device to be lowered to an extent such as is encountered subsequently during the regular use of the injection device (real usage conditions). For example, for step iii), in the surroundings of the injection device, provision is made of exactly the same components as those that are actually provided in the surroundings of the injection device during the regular operation thereof. Such components normally have an influence on the heat distribution in the surroundings of the injection device as the temperature is lowered. It is therefore advantageous for the components and the influence thereof on the temperature distribution in the surroundings of the injection device to also be taken into consideration for the method for producing an injection device. A freezing direction in an injection device in step iii) may, for example, be established by virtue of the method being carried out in parallel using multiple injection devices, and the method being terminated in each case at different points in time when the additive has still not fully frozen in the freezing direction. The individual injection devices used for carrying out the method may then be examined in order to establish where and/or to what extent the reducing agent has frozen. This may be checked, for example, through the use of an ultrasound process and/or an x-ray process. It is also possible for the injection devices used for carrying out the method to be disassembled in order to establish where frozen reducing agent has been present and where it has not been present.

With the objects of the invention in view, there is concomitantly provided a motor vehicle, comprising an internal combustion engine, an exhaust-gas treatment device for the purification of the exhaust gases of the internal combustion engine, and an injection device according to the invention, on the exhaust-gas treatment device, for the injection of an additive.

The particular advantages and structural features described for the injection device can also be applied and transferred to the two described methods. The same applies to the particular advantages and structural features described for the two methods (the production method and the method for freezing). The advantages and particular structural features can be transferred to the injection device according to the invention. In particular, the production method is thus also suitable for the production of the injection device described according to the invention.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in an injection device for metering a liquid additive, a method for freezing an injection device, a method for producing an injection device and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
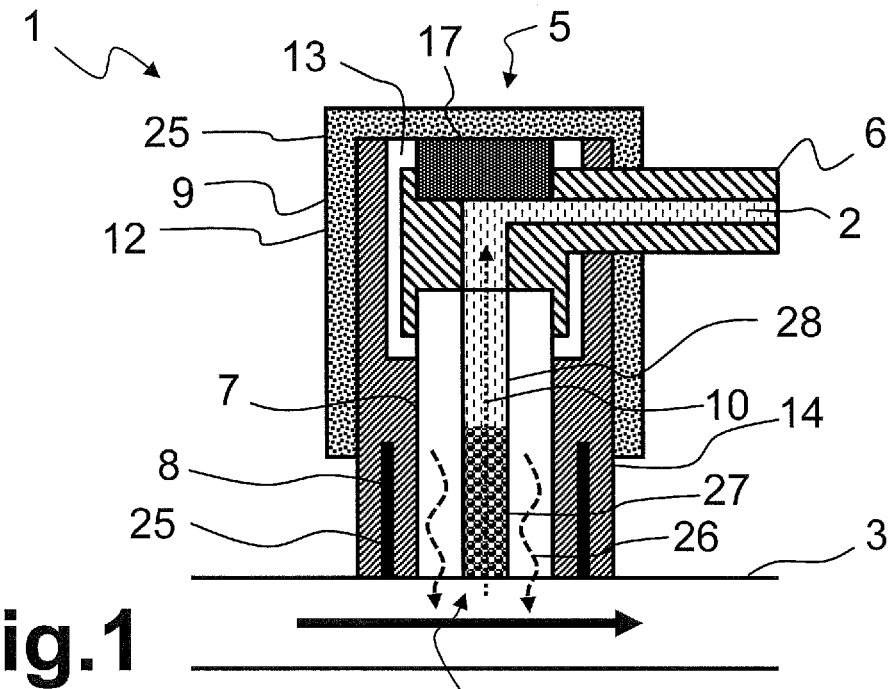
FIG. 1 is a diagrammatic, longitudinal-sectional view of a first embodiment of an injection device.

Referring now in detail to the figures of the drawing for explaining the invention and the technical field in more detail by showing particularly preferred structural variants to which the invention is not restricted and in which illustrated proportions are diagrammatic, and first, particularly, to FIGS. 1, 2 and 3 thereof, there are seen different embodiments of an injection device which have some corresponding features that will firstly be explained jointly below.

An injection device 1 has, in each case, a connector region 5 with a fluid line connector 6 and an outlet region 4. The outlet region 4 is placed in contact with an exhaust-gas treatment device 3. The connector region 5 is spaced apart from the exhaust-gas treatment device 3. The exhaust-gas treatment device 3 is, for example, in the form of an exhaust line. Exhaust gas can flow through the exhaust-gas treatment device during operation, as indicated therein by way of example by an arrow. The injection device 1 has a valve holder 14 and a valve 7 disposed in the valve holder 14. The valve 7 may, for example, be an injection valve or an injector, such as is also used, for example, for setting the flow rate of fuel for an internal combustion engine. The valve holder 14 serves for the mounting of the valve 7 and generally also produces a mechanical connection to the exhaust-gas treatment device 3. A duct 28 which is filled with additive 2 extends through the injection device 1 from the connector region 5 to the outlet region 4.

Figure 2:
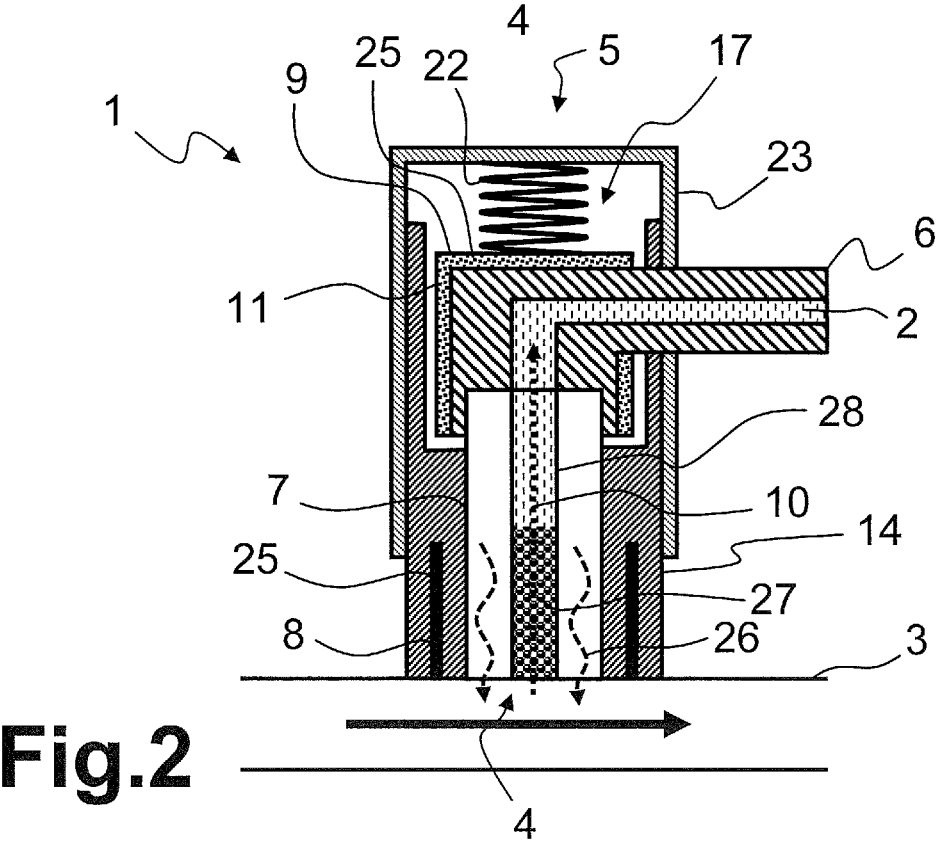
FIG. 2 is a longitudinal-sectional view of a second embodiment of an injection device.
Figure 3:
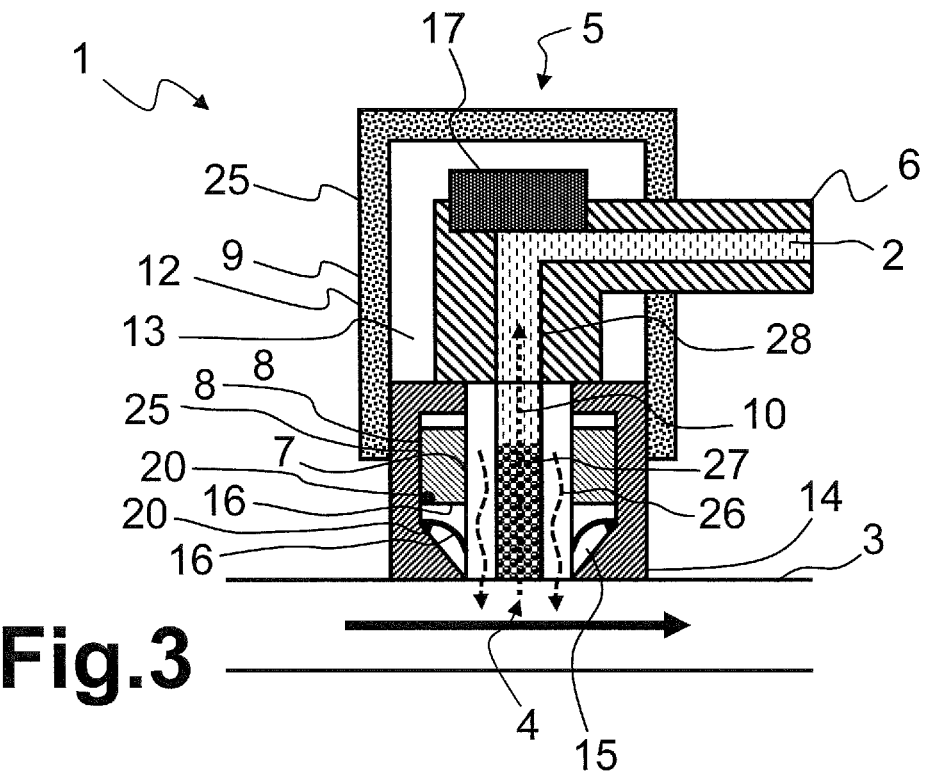
FIG. 3 is a longitudinal-sectional view of a third embodiment of an injection device.

Each of the structural variants of the injection device 1 according to FIGS. 1, 2 and 3 has a heat flow adjustment device or adjustor 25 which predefines a freezing direction 10 in the injection device 1, in such a way that the freezing direction 10 is oriented, in the duct 28, from the outlet region 4 toward the connector region 5. A plug 27 composed of frozen additive 2 is illustrated in each case in the outlet region 4. The heat flow adjustment device 25 has the effect that, in the event of freezing, a heat flow 26 is generated out of the injection device 1 through the outlet region 4, in each case counter to the freezing direction 10. In the structural variants according to FIGS. 1 to 3, heat-conducting structures 8 and heat insulators 9 are provided in each case as heat flow adjustment devices 25.

In the embodiment according to FIG. 1, a covering hood 12 is provided on the injection device 1 as a heat insulator 9. Through the use of the covering hood 12, an air cushion 13 is generated between the valve 7 or the duct 28 and the surroundings around the injection device 1. The air cushion insulates the injection device 1 or the valve 7 or the duct 28 in the connector region 5 with respect to surroundings of the injection device 1. Furthermore, in the structural variant according to FIG. 1, an ice pressure compensation element 17 is provided in the connector region 5. Through the use of the ice pressure compensation element 17, an increase in volume that occurs in the valve 7 or in the duct 28 in the event of freezing can be compensated.

In the embodiment according to FIG. 2, the heat insulator 9 is in the form of a plastics encapsulation 11 which may, for example, be injection-molded on a component of the injection device 1. An ice pressure compensation element 17 is also provided in the structural variant according to FIG. 2. In this case, the ice pressure compensation element 17 is formed by virtue of the fluid line connector 6 being preloaded against the valve 7 by using a spring 22 and a holder 23. The fluid line connector 6 can perform a compensating movement counter to the spring force of the spring 22 for the compensation of an increase in volume in the event of freezing.

It is likewise the case in the embodiment according to FIG. 3 that a covering hood 12, which forms an air cushion 13, is provided as a heat insulator 9. In this case, heat-conducting inserts 20 with heat-conducting plates 16 are additionally disposed in the duct 28 as a heat-conducting structure 8.

The embodiment according to FIG. 3 also has an ice pressure compensation element 17 in the connector region 5.

Figures 4, 5:
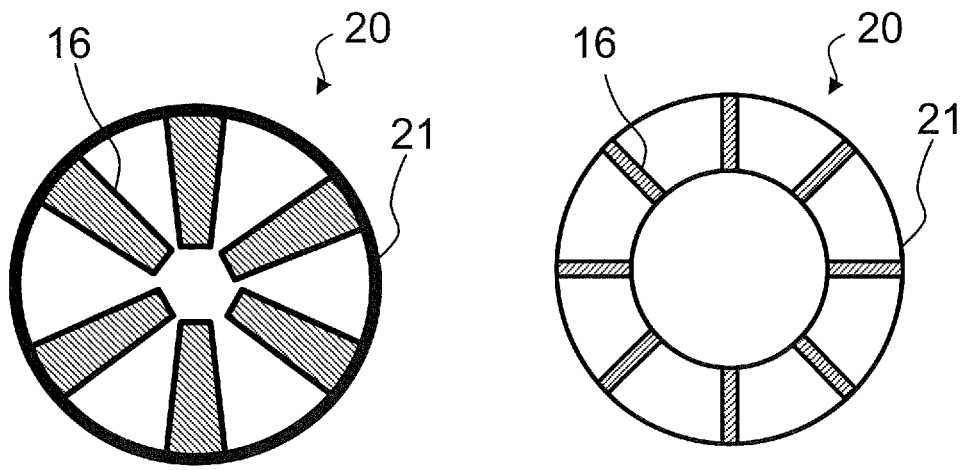
FIG. 4 is a cross-sectional view of a heat-conducting insert for an injection device, having a coolant duct.
FIG. 5 is a cross-sectional view of another heat-conducting insert for an injection device, having a coolant duct.

FIG. 4 and FIG. 5 illustrate heat-conducting inserts 20. The heat-conducting inserts 20 are special components that each have multiple heat-conducting plates 16. The heat-conducting inserts 20 can be inserted into a coolant duct 15 according to FIG. 3. FIG. 4 shows a lower heat-conducting insert 20 illustrated in FIG. 3. FIG. 5 shows an upper heat-conducting insert 20 illustrated in FIG. 3. The heat-conducting inserts are composed in each case of the heat-conducting plates 16 and of at least one carrier ring 21 which predefines the position of the heat-conducting plates 16 relative to one another. Through the use of heat-conducting inserts 20 of this type, it is possible in each case for multiple heat-conducting plates 16 to be inserted into the coolant duct 15 jointly in one working step. The heat-conducting insert 20 illustrated in FIG. 4 is configured so that the heat-conducting plates 16 are oriented in the coolant duct 15 in such a way that the heat-conducting plates 16 bear, directly in the outlet region, against a valve for dosing the fluid into the exhaust-gas treatment device, and heat is thus transported directly to the outlet region 4. For this purpose, the heat-conducting plates 16 of the heat-conducting insert 20 according to FIG. 4 bend when in the installed state. The heat-conducting plates 16 are preferably oriented so as to pose the least possible resistance to the regular cooling flow of the coolant through the coolant duct 15 during the operation of the injection device.

Figure 6:
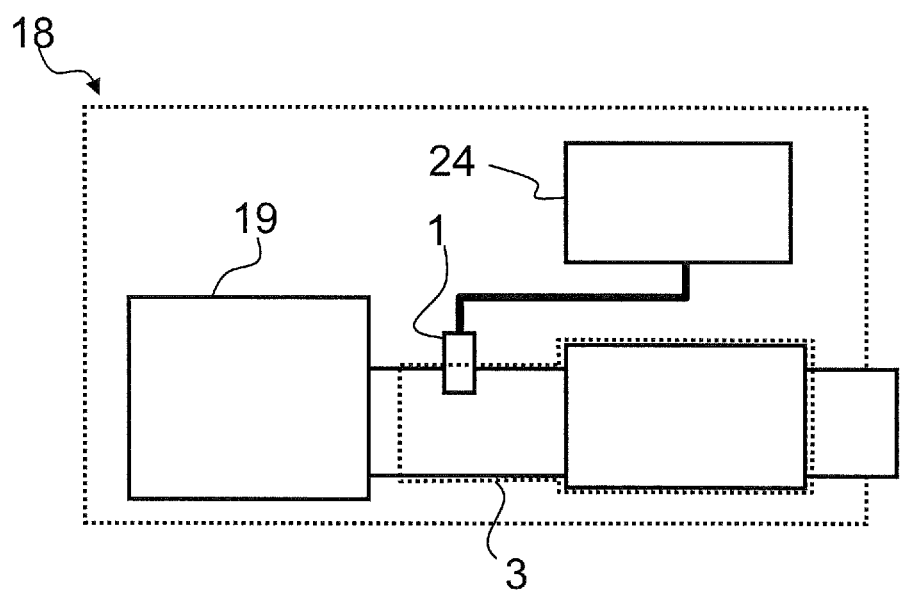
FIG. 6 is a block diagram of a motor vehicle having an injection device according to the invention.

FIG. 6 shows a motor vehicle 18 having an internal combustion engine 19 and an exhaust-gas treatment device 3 for the purification of exhaust gases of the internal combustion engine 19, in which an additive can be fed to the exhaust-gas treatment device 3 by using an injection device 1. The injection device 1 is supplied with additive by an additive supply device 24.

Even though the structural variants in the figures share common features, it is not imperative that the features are always provided. It is likewise not imperative that the various structural features can be used (only) alternatively. In fact, a person skilled in the art may readily make technically meaningful modifications based on the variants and taking into consideration the general description.

Taking the above-described prior art as a starting point, the invention has specified an injection device for injecting a liquid additive into an exhaust-gas treatment device, in which the injection device at least partially solves the technical problems discussed in the introduction. It is achieved in this case, in particular, that damage to the injection device as a result of freezing of the additive is prevented. Furthermore, the injection device has a particularly simple construction from a technical and control aspect and is inexpensive to produce. Advantageous methods for the freezing of an injection device for an additive, and methods for producing an injection device of this type, have also been specified.

The invention claimed is:

1. An injection device for metering a liquid additive into an exhaust-gas treatment device, the injection device comprising:
   an outlet region configured to be placed in contact with the exhaust-gas treatment device;
   a connector region spaced apart from said outlet region and having a fluid line connector and a duct for the additive running from said connector region to said outlet region;
   a valve configured to control metering of the additive; and
   at least one heat flow adjustment device configured to predefine a freezing direction in said duct from said outlet region toward said connector region;

said at least one heat flow adjustment device including a heat insulator surrounding said connector region;

said heat insulator being configured to reduce a heat flow from inside the injection device through said connector region into surroundings of the injection device in the event of freezing or in the event of cooling of the liquid additive inside the injection device.

2. The injection device according to claim 1, wherein said heat insulator surrounding said connector region is a plastics encapsulation injection-molded on the injection device.

3. The injection device according to claim 1, wherein said at least one heat flow adjustment device includes a covering hood surrounding said connector region, and an air cushion is formed between said covering hood and said valve.

4. The injection device according to claim 1, wherein said at least one heat flow adjustment device includes a heat-conducting structure disposed at said outlet region for conducting an outflow of heat from the injection device into the exhaust-gas treatment device to be placed in contact with said outlet region.

5. The injection device according to claim 1, which further comprises:
a valve holder configured to receive said valve and to place the injection device in contact with the exhaust-gas treatment device; and
at least one coolant duct disposed in said valve holder and configured to conduct a coolant flow through said coolant duct to cool said valve during operation of the injection device;
said at least one coolant duct including a heat-conducting structure and acting as said at least one heat flow adjustment device during a break in operation of the injection device.

6. The injection device according to claim 5, wherein said at least one heat flow adjustment device includes a heat-conducting plate disposed in said coolant duct.

7. The injection device according to claim 1, which further comprises at least one ice pressure compensation element disposed at said connector region, said at least one ice pressure compensation element configured to compensate an increase in volume of the additive when the additive solidifies.

8. The injection device according to claim 7, wherein said at least one ice pressure compensation element includes said fluid line connector, and said fluid line connector is configured to be displaceable, preloaded and not displaced at a regular operating pressure.

9. A method for freezing an injection device for metering a liquid additive into an exhaust-gas treatment device, the method comprising the following steps:
i) providing an injection device having an outlet region contacting the exhaust-gas treatment device, a connector region with a fluid line connector spaced apart from the outlet region, a duct running from the connector region to the outlet region, and at least one heat flow adjustment device including a heat-conducting structure disposed at said outlet region and a heat insulator surrounding said connector region;
ii) generating a heat flow from the injection device through the outlet region into the exhaust-gas treatment device using said heat-conducting structure disposed at said outlet region;
iii) at least partially preventing a heat flow from the injection device through the connector region into surroundings of the injection device in the connector region using said heat insulator surrounding said connector region;
iv) predefining a freezing direction in the duct from the outlet region toward the connector region;
v) forming a plug of frozen reducing agent in the duct at the outlet region; and
vi) enlarging the plug in the freezing direction.

10. The method according to claim 9, which further comprises providing the heat flow adjustment device as a coolant duct through which the heat flow flows out of the injection device through the outlet region into the exhaust-gas treatment device in step a).

11. A motor vehicle, comprising:
an internal combustion engine;
an exhaust-gas treatment device for purification of exhaust gases of said internal combustion engine; and
an injection device according to claim 1 disposed at said exhaust-gas treatment device and configured to inject an additive into said exhaust-gas treatment device.

12. An injection device for metering a liquid additive into an exhaust-gas treatment device, the injection device comprising:
the injection device being formed predominantly from plastic;
an outlet region configured to be placed in contact with the exhaust-gas treatment device;
a connector region spaced apart from said outlet region and having a fluid line connector and a duct for the additive running from said connector region to said outlet region;
a valve configured to control metering of the additive; and
at least one heat flow adjustment device configured to predefine a freezing direction in said duct from said outlet region toward said connector region;
said at least one heat flow adjustment device including a heat-conducting structure disposed at said outlet region for conducting an outflow of heat from the injection device into the exhaust-gas treatment device to be placed in contact with said outlet region;
said heat-conducting structure being in the form of a metallic insert in the injection device.

13. The injection device according to claim 12, wherein said metallic insert forming said heat-conducting structure is at least integrally molded or integrally cast into the plastic of the injection device.

* * * * *